Feb. 2, 1960 J. D. BUSHNELL 2,923,680
EXTRACTION PROCESS FOR REFINING LUBRICATING OILS
Filed Dec. 31, 1956
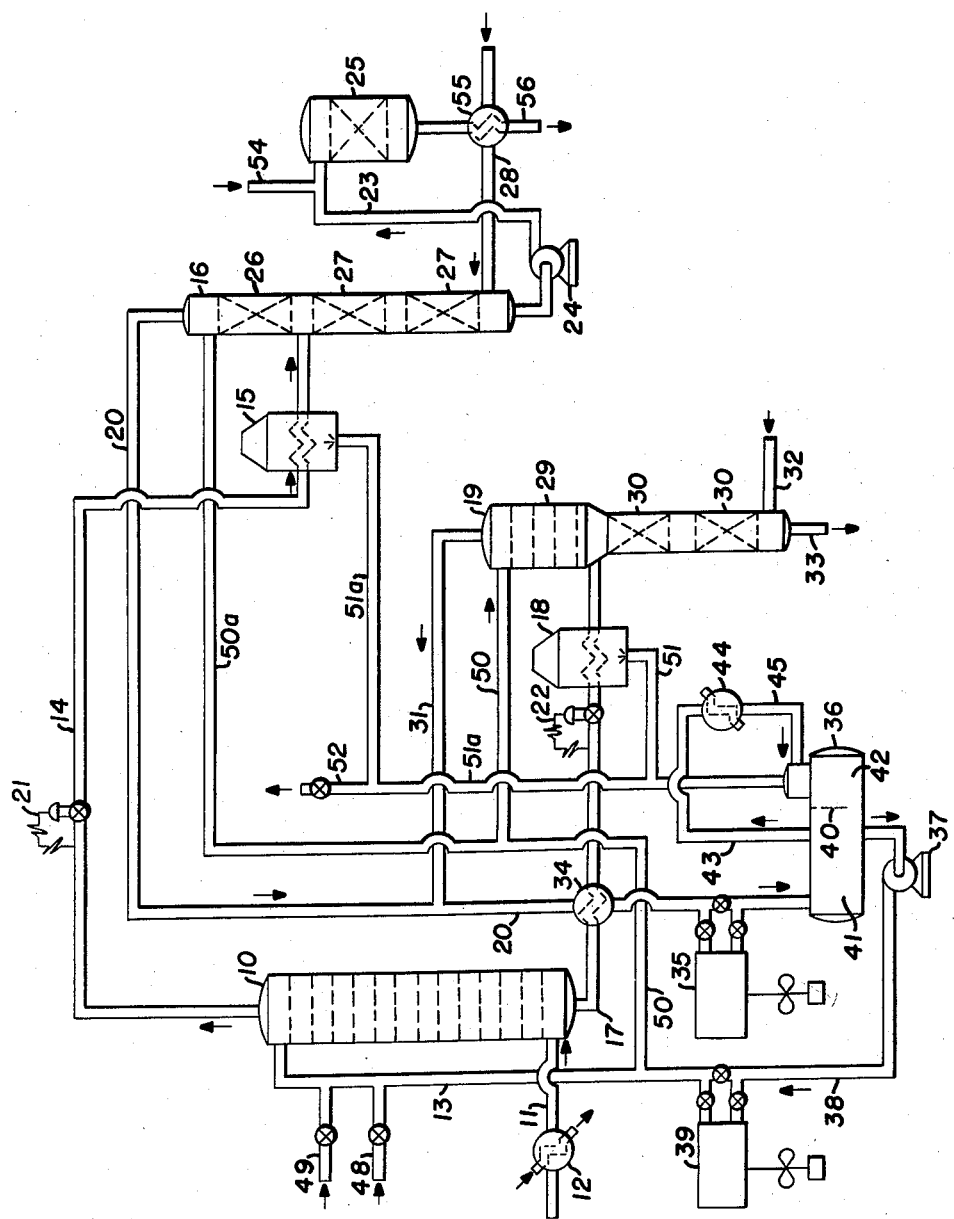
James D. Bushnell  Inventor
By *Byron O. Dimmick* Attorney

2,923,680

EXTRACTION PROCESS FOR REFINING LUBRICATING OILS

James D. Bushnell, Berkeley Heights, N.J., assignor to Esso Research and Engineering Company, a corporation of Delaware Application December 31, 1956, Serial No. 631,640

11 Claims. (Cl. 208—321)

The present invention covers an improved process for solvent treating lubricating oil fractions. More specifically it concerns improvements in the recovery of phenol from the raffinate and extract products obtained when subjecting a lubricating oil fraction to a phenol extraction treatment. A particular feature of the invention involves the combining of phenol extraction and hydrofining steps in a novel manner to effect advantageous savings in equipment and processing steps as well as improvements in finished lubricating oil quality, as will be developed more fully hereinafter.

It is of course well known to refine lubricating oil fractions by extracting therefrom undesirable constituents by the use of solvents such as phenol which have a preferential selectivity for the more aromatic constituents of the lubricating oil as compared to the more paraffinic constituents. The extracting of lubricating oil fractions with phenol has gained wide recognition as a highly desirable refining step. In general the process consists in treating the lubricating oil with phenol at a temperature at which the phenol is liquid whereby two layers of liquid are formed, the one layer, which is known as the extract, containing most of the phenol and the undesirable constituents that have been extracted from the lubricating oil, and the other layer, which is known as the raffinate, consisting of the refined oil as well as some phenol.

The usual procedure for conducting the phenol extraction is to contact the oil and the phenol in a counter-current tower treating operation in which the oil, which is the lighter component, is introduced into the bottom of the tower and the phenol, being the heavier component, is introduced into the top of the tower. The oil and phenol phases then flow counter-currently and come into intimate contact with each other, this contact usually being assisted by various contacting and distributing means. The pressure and temperature conditions for the extraction operation will depend upon the particular oil being treated, the volume of solvent used per volume of oil being treated, and the quality of the desired product. In general the temperature will lie somewhere between the melting point of the phenol and the temperature at which complete miscibility occurs between the oil and the phenol.

The solvent-rich or extract phase will be removed from the bottom of the tower, and the solvent-poor or raffinate phase will be removed from the top of the tower. Both the raffinate and extract phases contain dissolved phenol which must be recovered. The major portion of this phenol is vaporized and flashed off by heating the products to temperatures in the range of 450° to 750° F. Additionally, for economical operation it is necessary to recover the remaining small quantities of phenol which are still present in the raffinate and extract. This is usually accomplished by stripping with steam at atmospheric or subatmospheric pressures or by reboiling the products under vacuum and stripping with heavy hydrocarbons.

Steam stripping has the disadvantage of getting water into the unit, which water must then be removed to keep the proper solvent composition. The water must first be concentrated into a corrosive phenolic water azeotrope in a drier tower, and then leave the unit through an absorber in which feed stock scrubs phenol out of the water vapor. A great deal of expensive equipment is thus required to handle the steam. Dry vacuum reboiling has the disadvantage of requiring large diameter towers, due to the high volume of the vapors under vacuum. Also vacuum pumps and other complicated equipment are required. On deasphalted oils it is difficult to reboil the stock because of the high temperature and high vacuum required.

In accordance with the present invention these disadvantages are avoided by employing a gas other than steam for the stripping operation, using pressures of from atmospheric to 100 p.s.i.g. The gas may be an inert gas or it may be a light hydrocarbon vapor, preferably the latter. If, as is preferred, the gas is a combustible gas it may be burned as fuel after it has been employed as a stripping agent. Hydrocarbon gases of from 1 to 4 carbon atoms are preferred. Thus, for example a mixture of propane and butanes may be advantageously used when available from other sections of the refinery.

In a preferred embodiment of the invention the hot raffinate immediately after stripping is sent to a hydrofining unit to improve the color and color stability of the lubricating oil. Degradation of the lubricating oil is thereby minimized to a very high degree.

The nature of this invention may be more readily understood when reference is made to the accompanying drawing in which the single figure diagrammatically illustrates a plant suitable for the carrying out of the combined phenol extraction, solvent stripping and hydrofining reactions.

Referring specifically to the drawing a phenol extraction tower 10 is provided which may be packed with suitable contacting material such as Raschig rings, baffle plates or disc and donut plates. Preferably the contacting means comprises a plurality of underflow weir trays. The lubricating oil fraction to be treated enters through feed line 11 and is heated to the proper inlet temperature by means of heat exchanger 12. Phenol enters the extraction tower through phenol line 13 and flows downwardly through the tower so as to effect counter-current contact with the upflowing lubricating oil. The oil that has been contacted with the phenol leaves the top of the tower as a raffinate phase through line 14, is heated in a heater or furnace 15 and is then sent to a raffinate recovery tower 16. Similarly the extract phase leaves the bottom of the extraction tower through line 17 and passes through heater or furnace 18 and is sent into an extract recovery tower 19.

Preferably the extraction in tower 10 is run under pressure, using pressures of from about 50 to about 250 p.s.i.g., so that the raffinate phase and extract phase will each flow to its respective recovery tower without further pumping. Means for controlling this operation include flow control valve 21 in line 14, which is adjusted to maintain the desired phenol-oil interface in the extraction tower, and back-pressure control valve 22 in line 17, which serves to regulate the flow of extract phase from the tower. Pressure operation in this manner eliminates the need for the surge drums conventionally employed in phenol extraction plants to receive the extract and raffinate phases prior to further handling, as well as the booster pumps conventionally used to send these phases to their respective recovery systems. A further advantage of pressure operation is that it prevents vaporization of dissolved stripping gas from the recycled phenol entering the tower, which vaporization might otherwise disrupt the internal hydraulics of the extraction tower.

Referring now specifically to the raffinate recovery tower 16, it will be noted that this tower has a rectifying zone 26 in its upper portion and two stripping zones 27 in its lower portion. Each of the stripping zones and the rectifying zone may comprise a bed of one-inch rings, for example, although other types of contacting surfaces may be used. Thus, alternatively, the rectifying zone 26 could comprise a plurality of bubble cap plates. Stripping gas enters the recovery tower at the bottom through line 28 and flows upwardly, stripping phenol from the downflowing raffinate. Oil which is vaporized in the furnace and the stripping zones is condensed in the superimposed rectifying zone 26. Leaving the recovery tower overhead through line 20 will be a mixture of stripping gas, water vapor, phenol vapors and traces of oil.

The extract recovery tower 19 likewise includes an upper rectifying zone 29 and two stripping zones 30. Here again the stripping zones may be made up of beds of one-inch rings, whereas the rectifying zone preferably comprises a plurality of bubble cap trays. The type of internal surfaces provided in the stripping zones will depend largely on economic factors. Thus, although rings may be employed in smaller diameter towers, larger units may utilize trays for example. Stripping gas enters the bottom of the extract recovery tower through line 32 and strips phenol from the downflowing extract. Condensation of vaporized extract oil takes place in the upper rectifying zone 29. Stripping gas, water vapor and phenol vapors leave the rectifying zone overhead through vapor line 31.

Stripped extract leaves the lower stripping zone 30 through line 33 and may be sent to storage. If the extract is to be used as a blending component of fuel oil and its volume is small in comparison to the total fuel oil volume of the refinery, it may be sent directly to the fuel oil blending system. In those cases where the traces of stripping gas dissolved in the stripped extract may present a problem in giving the product an undesirably low flash point or explosivity characteristics the extract may be stripped with steam before use.

The vapors from the raffinate recovery tower and extract recovery tower are both conducted through line 20 to phenol surge drum 36, first passing through heat exchanger 34 to give up some of their heat to the extract phase flowing through line 17 and then passing through an air cooled condenser 35 before entering the phenol surge drum. Phenol collecting in surge drum 36 is pumped by means of pump 37 through line 38 to be recycled to the phenol extraction tower through line 13. If cooling is necessary, at least a portion of the stream may be diverted through aftercooler 39, which may be an air-cooled condenser. A portion of the recycle phenol is sent through lines 50 and 50a to supply phenol reflux for the rectifying zones 26 and 29 in the two recovery towers. Makeup water and makeup phenol for the phenol extraction tower are supplied through lines 48 and 49.

Fuel gas leaving the phenol surge drum 36 is conducted through lines 51 and 51a to be burned in the furnaces 15 and 18. Any fuel gas in excess of that required for the furnaces is removed through line 52 to be flared or to be used otherwise.

It will be noted that phenol surge drum 36 is provided with a vertical baffle 40 which extends from the top of the drum almost to the bottom and separates the drum into a large compartment 41 and a smaller compartment 42. This double-compartmented drum operates in conjunction with a knock-back condenser 44 to minimize the cycling of light hydrocarbons through the system and at the same time to minimize loss of phenol in the hydrocarbon vapors. If the phenol surge drum is operated at a relatively low temperature, say 100° to 150° F., significant quantities of light hydrocarbons will dissolve in the phenol. This is undesirable, because these light hydrocarbons will recycle throughout the system, adding heat loads and vapor loads to the equipment. However, if the drum is operated hot, the hydrocarbon vapors leaving the drum will carry away excessive quanties of vaporized phenol. Both of these difficulties are avoided in the present arrangement.

Wet phenol and stripping gas from the recovery towers pass, as previously stated, through condenser 35 before entering the large compartment 41 of the phenol surge drum. By adjusting the temperature and pressure conditions to, say, 20 to 75 p.s.i.g. and 200 to 300° F. for the stream leaving condenser 35 and entering the drum, only a small amount of light hydrocarbons will dissolve in the wet phenol. The uncondensed hydrocarbon vapors in compartment 41 contain appreciable amounts of phenol vapor and water vapor. These vapors flow through line 43 to a knock-back condenser 44, where all but traces of the phenol, and most of the water are condensed out. The outlet temperature is adjusted high enough so that enough water vapor leaves with the gas to prevent the buildup of water in the phenol; but low enough so that excessive phenol losses do not occur.

The water and phenol condensed in the knock-back condenser are sent through line 45 to the smaller compartment 42 in the phenol accumulator drum, where they are separated from the uncondensed vapor. The liquid in this compartment is lower in temperature and in phenol concentration than the wet phenol liquid in the larger compartment 41 of the drum. Vertical baffle 40 extends below the liquid level in either compartment, but since the level in compartment 42 is higher than that in compartment 41, the liquid in the smaller compartment flows underneath the baffle and mixes with the liquid in the large compartment. Under these conditions the level of liquid in the smaller compartment is automatically kept just enough higher than the level in the large compartment so that the differential static head balances the pressure drop through the knock-back condenser and associated lines.

This arrangement results in less light hydrocarbon being dissolved in the wet phenol, thereby reducing loadings in the rest of the plant. It also enables high recovery of phenol, as losses in the vapors leaving the small compartment 42 are at a minimum. An additional advantage of the arrangement is that it gives good heat economy, since only a very small portion of the phenol is cooled below the desired temperature for use in the extraction tower.

As indicated above, a particular feature of the invention involves the combining of the phenol extracting and hydrofining steps in a manner that will effect advantageous savings in equipment and processing steps. In normal operations the lubricating oil raffinate from a phenol extraction step, after having been heated for solvent removal, is cooled and sent to intermediate storage. If the pour point and cloud point of the lubricating oil are higher than desired, the raffinate is usually then dewaxed and pumped to another storage tank. Finally the oil is subjected to a color improvement step which involves clay contacting or hydrofining. If the improvement step involves hydrofining, the oil must be reheated to temperatures of 600 to 700° F. In the present invention a different process sequence is used. Hot raffinate leaving the raffinate recovery tower at temperatures of from 600 to 700° F. is immediately mixed with a hydrogen-rich gas at pressures of 100 to 800 p.s.i.g. and sent directly to a hydrofining reactor where compounds of poor color and poor stability present in the lubricating oil are destroyed. The hydrofining step is conducted at temperatures of 550° F. to 700° F., preferably in the presence of cobalt molybdate.

Referring to the drawing, hot raffinate leaving the tower 16 by means of line 23 is pumped with pump 24 into hydrofining reactor 25, being combined with a hydrogen-rich gas that is added through line 54. This hydrogen-rich gas may comprise, for example, the tail gas from a hydroformer. The hydrofined lubricating oil leaves the reactor through line 56 and may advantageously be first sent through a heat exchanger 55 where it gives up some of its heat to the stripping gas entering the raffinate recovery tower through line 28. The hydrofined oil is then sent to a separator (not shown) and subsequently steam-stripped to remove hydrogen sulfide and to correct the flash point of the hydrofined product. If dewaxing is required this step is carried out subsequently. Equipment for these steps is not shown in the drawing, as they do not form a part of the invention.

The process sequence wherein the hot raffinate is immediately sent to the hydrofining zone has the following advantages:

(1) Cooling, intermediate storage, and reheating of the raffinate to hydrofining temperature are eliminated.

(2) Since hydrofined raffinate is more stable than unhydrofined oil, and since time in storage is reduced, better color products can be produced at a given severity of treatment.

(3) On some dewaxed stocks the pour and cloud points are raised by hydrofining. In the present invention the hydrofining of waxy stocks occurs previous to dewaxing; thus any pour and cloud elevation due to hydrofining is automatically corrected by the subsequent dewaxing step.

(4) Where fuel gas is used to strip out final traces of phenol in the raffinate recovery tower, some of the fuel gas dissolves in the raffinate product. This must be removed by steam stripping before the raffinate is sent to tankage, or else the tanks must be equipped to handle the gas which will disengage from the oil during storage. In the integrated unit covered by this invention, the dissolved gases in the raffinate are sent through the hydrofining reactor and are removed by the hydrofined product stripper. This stripper therefore does double duty.

(5) Since the raffinate is stripped with the hydrocarbon gas the raffinate will be free of oxygen, which is known to degrade the color in subsequent hydrofining.

Among other advantages of the present invention, the following may be mentioned. Conventional phenol extraction plants are provided with a drier tower, in which essentially all water in the extract phase is taken overhead as an azeotrope containing 10 to 15% phenol. Excess water is brought into the unit dissolved in the feed, or by using stripping steam to remove phenol from the extract and raffinate products. In order to remove the excess water without large phenol losses, the water azeotrope is vaporized and passed through an absorber tower countercurrent to the oil feed stock. The remainder of the water azeotrope is recombined with the dry phenol before entry to the treater tower and/or at intermediate points in the treater tower to induce reflux.

In the present invention the drier and absorber towers are not needed in the phenol plant. As mentioned earlier both phenol and water are carried overhead from the recovery towers and condensed in a wet phenol surge drum. The used stripping gas is separated from the wet phenol in the phenol surge drum under such conditions of temperature and pressure that the gas carries out traces of water which come in with the feed and with the inlet stripping gas, thus maintaining the wet phenol at a preselected water content for phenol treating, e.g. 2 to 10 volume percent water on a liquid basis. In a typical example, the conditions might be 30 p.s.i.g. and 130 to 175° F. Under these conditions the losses of phenol in the gas are negligible, so that no absorber tower is required.

The following is a representative example of a refining operation conducted in accordance with the present invention. A feed stream consisting of about 1400 b./s.d. (barrels per stream day) of a light or a heavy vacuum lube distillate enters extraction tower 10 at a temperature of from 120° F. to 180° F. and is extracted at 140 to 160 p.s.i.g. with 4000 to 5000 b./s.d. of wet phenol of about 5% water content which enters the top of the tower at a temperature of about 180° to about 205° F. The temperature, quantity and water content of the phenol are adjusted in accordance with the yield of raffinate desired. In this case the yield will be about 800 to 850 b./s.d. of raffinate phase and about 4700 to 5500 b./s.d. of extract phase.

The raffinate phase leaving the top of the tower is heated to 675 to 700° F. in furnace 15 and enters the recovery tower 16 below the rectifying zone 26 at a pressure of about 45 to 50 p.s.i.g. Vaporized phenol rises into zone 26 while the liquid portion of the raffinate phase feed stream is stripped in zones 27 with a gas comprising $C_3$ and $C_4$ hydrocarbons entering through line 28 at a rate of 150 to 200 thousand standard cubic feet per stream day. The vapors carried into zone 26 will contact reflux phenol entering the top of the zone through line 50a.

The stripped raffinate leaving the bottom of tower 16 will have a temperature of about 625 to 650° F. and will have cooled to about 600 to 625° F., by the time that it has been combined with the hydrogen-rich gas entering through line 54 at about 500° F. About 300 to 350 thousand cubic feet of hydrogen-rich gas will have been required for the 675 to 700 b./s.d. of stripped raffinate that is subjected to the hydrofining. The hydrofining is conducted in zone 25 at a temperature of 600 to 625° F. under a pressure of 150 to 175 p.s.i.g., preferably using cobalt molybdate catalyst at a rate of 1.5 v./h./v. In place of cobalt molybdate, other catalysts such as nickel tungsten sulfide, molybdenum sulfide, etc. may be used. The hydrofined raffinate is cooled to about 400 to 450° F., steam stripped under vacuum and then sent to a dewaxing step, if dewaxing is required.

The extract phase leaving the bottom of the extract tower 10 receives a preheat by passing through heat exchanger 34 and is then heated to 600° F. in furnace 18 before it enters the extract recovery tower 19. The feed stream enters the extract recovery tower below the bottom tray of the rectifying zone 29. The vapor portion of the feed, which amounts approximately to 90% of the feed by weight, passes through the rectifying zone 29 where it is contacted by wet phenol entering the top of the rectifying zone through line 50. The liquid portion of the feed is stripped at pressures of 45 to 50 p.s.i.g. in stripping zone 30 with the same type of gas used in tower 16, about 300 to 350 thousand cubic feet per stream day of gas being required.

As stated previously the light hydrocarbon stripping gas containing stripped phenol vapors and water passes overhead from each of the recovery towers and the combined streams are cooled in heat exchanger 34 and air cooled in condenser 35 before flowing into the accumulator drum or phenol surge drum 36. As also previously stated, the light hydrocarbon gases containing traces of phenol pass through line 51 and 51a to be used as fuel in the furnaces 15 and 18, while excess gas above that needed for the furnaces is bled off through line 52 to a flare.

It is to be understood that the specific examples given herein are not intended to limit the invention in any manner. Also the invention in its broadest aspects is not to be restricted to lube oil operations. The combined extraction and hydrofining process can also be applied to treatment of catalytic cracking feed stock or recycle stock, where the extraction step is used to remove aromatics and the hydrofining step to remove sulfur from the raffinate. The scope of the invention is to be determined by the appended claims.

What is claimed is:

1. An improved process for refining a lubricating oil fraction which comprises contacting said fraction with phenol in a phenol extraction zone under conditions forming a solvent extract phase and a raffinate phase, separately removing said solvent extract phase and said raffinate phase from said extraction zone, heating said extract phase to a temperature of from 450° to 750° F., vaporizing the major portion of the phenol from said extract phase in a first vaporizing zone maintained at a temperature within said last-named temperature range, conducting the heated extract to a first stripping zone, stripping residual phenol from said extract with a non-aqueous stripping gas in said stripping zone, removing stripped extract from said stripping zone, heating said raffinate phase to a temperature of from 450° to 750° F., vaporizing the major portion of the phenol present in said raffinate phase therefrom in a second vaporizing zone maintained at a temperature within said temperature range, conducting the heated raffinate to a second stripping zone, removing residual phenol from said raffinate with a non-aqueous stripping gas in said second stripping zone, conducting stripped hot raffinate from said second stripping zone into a hydrofining zone, contacting said raffinate with hydrogen in said hydrofining zone and recovering therefrom a refined lubricating oil.

2. Process as defined by claim 1 wherein said hydrofining step is conducted at temperatures of from 550° to 700° F. at pressures of from 100 to 800 p.s.i.g. in the presence of cobalt molybdate.

3. Process as defined by claim 1 wherein said phenol extracting and hydrofining steps are conducted prior to a dewaxing step.

4. An improved process for refining a lubricating oil fraction which comprises contacting said fraction with phenol in a phenol extraction zone under conditions forming a solvent extract phase and a raffinate phase, separately removing said solvent extract phase and said raffinate phase from said extraction zone, heating said extract phase to a temperature sufficient to vaporize and flash the major portion of the phenol from said extract phase, conducting said heated extract phase to a first stripping zone, stripping residual phenol from said extract in said stripping zone with a non-aqueous stripping gas comprising gaseous hydrocarbons, removing stripped extract from said stripping zone, heating said raffinate phase to a temperature sufficient to vaporize and flash the major portion of the phenol present in said raffinate phase, conducting the heated raffinate to a second stripping zone, removing residual phenol from said raffinate in said second stripping zone with a non-aqueous stripping gas comprising gaseous hydrocarbons, removing stripped hot raffinate from said second stripping zone, recovering phenol from said stripping gases and then burning at least a portion of said gases to furnish heat for the steps of heating said extract and raffinate phases to vaporize the phenol therefrom.

5. Process as defined by claim 4 wherein the said stripping gas comprises a hydrocarbon gas of from 1 to 4 carbon atoms.

6. Process as defined by claim 4 wherein the said stripping gas comprises $C_3$ and $C_4$ hydrocarbons.

7. Process as defined by claim 4 wherein said phenol extraction is conducted at pressures of from about 50 to about 250 p.s.i.g. and said stripping step is conducted at pressures of from atmospheric to about 100 p.s.i.g.

8. Process as defined by claim 4 wherein said phenol extraction is conducted at pressures of 140 to 160 p.s.i.g. and said stripping is conducted at pressures of from about 45 to 50 p.s.i.g.

9. In the refining of a lubricating oil fraction wherein said fraction is contacted with phenol, containing a minor proportion of water, in a phenol extraction zone under conditions forming a solvent extract phase and a raffinate phase, said solvent extract phase and said raffinate phase are separately removed from said extraction zone and the major portion of the phenol present in each of the said phases is then removed by heating each of those phases to a temperature sufficient to vaporize and flash the major portion of the phenol from the said phases, the improved method for the removal and recovery of residual phenol from each of said phases which comprises stripping each of the said phases with a non-aqueous stripping gas in a stripping zone, conducting the stripping gas effluents containing water vapor and phenol vapors from said stripping zones to a wet phenol surge zone, and contacting said gases with wet phenol in said last named zone under conditions effecting removal of phenol from said gases while retaining water in the gases leaving said surge zone, whereby said wet phenol is maintained at a preselected water content.

10. Process as defined by claim 9 wherein said phenol recovery is effected by first contacting said gases with said wet phenol under conditions of temperature and pressure causing condensation of the major portion of the phenol contained in said gases while leaving the major portion of the water vapor contained in said gases uncondensed, thereafter conducting said gases to a condensing zone maintained under conditions condensing essentially all of the remaining phenol and a major portion of the water from the said gases, and conducting said last named water and phenol to said wet phenol surge zone, said conditions in said condensing zone being such as to remove from said gases only sufficient water to maintain the wet phenol at said preselected water content.

11. Process as defined by claim 9 wherein said stripping gas comprises a hydrocarbon gas of from 1 to 4 carbon atoms.

References Cited in the file of this patent

UNITED STATES PATENTS

| | | |
|---|---|---|
| 2,104,401 | Murphree | Jan. 4, 1938 |
| 2,216,933 | Atkins | Oct. 8, 1940 |
| 2,673,174 | King | Mar. 23, 1954 |
| 2,687,982 | Baumann | Aug. 31, 1954 |
| 2,692,222 | Packie | Oct. 19, 1954 |

FOREIGN PATENTS

| | | |
|---|---|---|
| 482,971 | Canada | May 6, 1952 |